US012597768B2

(12) United States Patent
Shen

(10) Patent No.: US 12,597,768 B2
(45) Date of Patent: Apr. 7, 2026

(54) SERIES TYPE HYBRID CIRCUIT BREAKER WITH NON-RESONANT CURRENT ZERO-CROSSING GENERATION

(71) Applicant: Zheng John Shen, White Rock (CA)

(72) Inventor: Zheng John Shen, White Rock (CA)

(73) Assignee: SYNQUE CONSULTING INC., White Rock (CA)

( * ) Notice: Subject to any disclaimer, the term of this patent is extended or adjusted under 35 U.S.C. 154(b) by 164 days.

(21) Appl. No.: 18/625,383

(22) Filed: Apr. 3, 2024

(65) Prior Publication Data

US 2025/0316977 A1    Oct. 9, 2025

(51) Int. Cl.
| | |
|---|---|
| *H02H 7/00* | (2006.01) |
| *H01H 9/54* | (2006.01) |
| *H02H 3/08* | (2006.01) |
| *H02H 7/26* | (2006.01) |

(52) U.S. Cl.
CPC .............. *H02H 7/26* (2013.01); *H01H 9/542* (2013.01); *H02H 3/08* (2013.01)

(58) Field of Classification Search
None
See application file for complete search history.

(56) References Cited

U.S. PATENT DOCUMENTS

| | | | |
|---|---|---|---|
| 11,670,933 B2 | 6/2023 | Shen et al. | |
| 2008/0239602 A1* | 10/2008 | Kasztenny | H02H 3/402 361/65 |

| | | | |
|---|---|---|---|
| 2010/0097733 A1* | 4/2010 | E. | H02H 1/0015 361/42 |
| 2019/0087138 A1* | 3/2019 | Suzuki | G06F 3/1208 |
| 2020/0251295 A1 | 8/2020 | Ängquist et al. | |
| 2023/0198248 A1* | 6/2023 | Qi | H02H 9/025 361/93.9 |

OTHER PUBLICATIONS

Shen, Z.J., et al., "A Series-Type Hybrid Circuit Breaker Concept of Ultrafast DC Fault Protection," IEEE Transactions on Power Electronics, (2022), June 6, vol. 37, Issue 6, pp. 6275-6279.

* cited by examiner

*Primary Examiner* — Stephen W Jackson
(74) *Attorney, Agent, or Firm* — Pauley Erickson & Swanson

(57) ABSTRACT

A series-type hybrid circuit breaker to provide protection against short circuit faults in DC or AC power circuits. A series-type hybrid circuit breaker (SHCB) forces a fault current into a high-frequency AC current with zero crossings and allows a mechanical circuit breaker to disconnect the faulty branch. The SHCB injects a transient counter voltage pulse via a pulse transformer into the main power loop upon detection of an overcurrent condition and forces the fault current to change its original direction and cross zero to a negative peak value. A generation power electronic circuit on the primary side of the transformer controls the discharge of a capacitor to generate the counter voltage pulse during the first phase of each switching cycle of the fault interruption process. The power electronic circuit then changes the polarity of the injected secondary voltage and forces the fault current to change direction and cross zero again.

15 Claims, 8 Drawing Sheets

SERIES TYPE HYBRID CIRCUIT BREAKER WITH NON-RESONANT CURRENT ZERO-CROSSING GENERATION

FIELD OF THE INVENTION

This invention relates generally to circuit breakers in direct current (DC) or alternating current (AC) power distribution or transmission systems. More particularly, it relates to a series-type hybrid circuit breaker that quickly forces a fault current into a form of high-frequency AC current with zero crossings and allows a series-connected mechanical circuit breaker to disconnect the faulty branch safely.

BACKGROUND OF THE INVENTION

DC power systems are gaining tractions in recent years since they offer higher efficiency and power capacity. However, protecting these DC power systems against short circuit faults remains a major technical challenge. Traditional mechanical circuit breakers (MCBs), such as vacuum interrupter (VI) and molded case circuit breaker (MCCB), are widely used in AC power systems, which rely on natural AC current zero crossings to extinguish the breaking arc and offer a relatively long fault interruption time of a few AC cycles (tens of milliseconds). MCBs are generally incapable of interrupting a DC fault current because of lack of natural zero crossings in DC power circuits. Solid-state circuit breakers (SSCBs) can quickly interrupt DC fault current within tens of microseconds but suffer from high conduction losses. It is worth noting that the response time of an SSCB is mostly determined by the time that the metal-oxide-varistor (MOV) takes to dissipate the residual system electromagnetic energy rather than by the turnoff speed of the power semiconductor switching devices. The most distinct advantage of the prior art SSCBs is the fast switching of the power semiconductor devices during infrequent fault interruption operation while the most distinct disadvantage is the continuous flow of current through the same semiconductor devices during normal operation. It would be highly desirable to use the fast switching property of the semiconductor devices in new circuit protection architectures during fault interruption but avoid running current continuously through them during normal operation.

Hybrid circuit breakers (HCB) offer a very low conduction loss but only a moderate response time of several milliseconds (much slower than SSCB). It is worth noting that the response time of an HCB is determined by the opening speed of the main mechanical switch, which is often too long for many modern DC or AC power systems. Current HCBs are of parallel nature (although the word "parallel" may not explicitly used), in which a commutation path is connected in parallel with the main mechanical breaker. The fault current in the mechanical breaker is initially commutated to the commutation path to create current zero crossings in various forms to aid the safe opening of the mechanical breaker. The commutation path will be interrupted without arcing afterwards by turning off the semiconductor switch in the path. One known HCB design concept is to use a LC resonant circuit made of an inductor and capacitor in the commutation path to generate a current pulse with higher amplitude than the fault current to be interrupted, and thus current zero crossings in the mechanical circuit breaker. Such a pulse can be created by releasing the charge in a pre-charged capacitor by a semiconductor switch. The LC resonant circuit can also be excited by a voltage source converter as described in US Patent Publication US 2020/0251295. Disadvantages of these resonant-type HCBs include a finite excitation time taken to achieve artificial current zero crossings in the MCB and a very high current rating required for the semiconductor switch to turn on and turn off the resonant current.

A series type HCB (SHCB) concept was recently suggested to use a pulse transformer in series with a mechanical switch to force a fault current into a near-zero small AC ripple current by injecting and regulating a counter voltage into the main power circuit (U.S. Pat. No. 11,670,933 and Z. J. Shen et al., "A Series-Type Hybrid Circuit Breaker Concept for Ultrafast DC Fault Protection," IEEE Transactions on Power Electronics, Vol. 37, No. 6, 2022, each incorporated by reference). This method allows for a very low conduction loss and a very short response time to drive the fault current to zero or near-zero. However, it requires a large pre-charged capacitor to support the fault interruption process which may last several milliseconds. Furthermore, the pulse transformer primary current of the SHCB may become excessively high and mandate high current ratings of the power electronic circuit. Both factors contribute to a prohibitively high cost of the design.

An objective of this invention is to teach a series-type hybrid circuit breaker that quickly forces a fault current into a form of high-frequency AC current with zero crossings and allows a series-connected mechanical circuit breaker to disconnect the faulty branch safely. It is significantly different from the prior art parallel-type HCB with resonant current zero crossing generation in that the current zero crossings are generated solely by the switching of a power electronic circuit instead of LC resonance. It is also significantly different from the prior art SHCB in that a much smaller capacitor can be used which is recharged by the main power loop periodically to maintain its operating voltage and the amplitude of the high-frequency AC current is much higher than the small AC ripple current in the prior art SHCB.

SUMMARY OF THE INVENTION

The present invention comprises a series-type hybrid circuit breaker to provide protection against short circuit faults in DC or AC power circuits. Embodiments of this invention provide or include a series-type hybrid circuit breaker (SHCB) that quickly forces a fault current into a form of high-frequency AC current with zero crossings and allows a series-connected mechanical circuit breaker (MCB) to disconnect the faulty branch safely. The SHCB injects a transient counter voltage pulse via a pulse transformer into the main power loop upon detection of an overcurrent condition and forces the fault current to change its original direction and cross zero to a negative peak value. A non-resonant current zero-crossing generation power electronic circuit on the primary side of the transformer controls the discharge of a pre-charged capacitor to generate the counter voltage pulse during the first phase (termed "active" mode) of each switching cycle of the fault interruption process. During the subsequent second phase (termed "recharge" mod), the power electronic circuit changes the polarity of the injected secondary voltage and forces the fault current changes its direction and cross zero again. The capacitor is recharged to its original voltage by the main power circuit in the "recharge" mode. During the subsequent third phase (termed "inactive" mode), the power electronic circuit decouples the capacitor from the transformer until the next switching cycle. The isolated transformer behaves as an inductor in the main power loop during the "inactive" mode of the SHCB. This process repeats a number of times (e.g., 5 to 20) until the MCB opens safely with the aid of the current zero crossings generated by the power electronic circuit. Note that the power electronic circuit remain inactive and does not incur any power loss during normal operation.

The invention may be used in bidirectional DC or AC circuits. Semiconductor switches such as silicon or silicon carbide insulated-gate bipolar transistors (IGBTs), thyristors, power MOSFETs, diodes, along with a digital controller, can be used to control the SHCB operation.

Embodiments of the invention include a circuit protection apparatus for interrupting a direct-current (DC) or alternating-current (AC) fault current and isolating the fault from the power system. The apparatus includes a non-resonant current zero-crossing generation circuit operable to force a fault current in a main power circuit to cross zero a plurality of times (e.g. 5 to 20) in form of high-frequency AC current within a specified response time window upon detection of fault condition. The apparatus desirably also includes a mechanical circuit breaker in series connection with said non-resonant current zero-crossing generation circuit, the mechanical circuit breaker operable to interrupt the fault current and isolate the faulty circuit branch within said time window. The apparatus desirably also includes at least one current sensor operable to detect the direction and amplitude of current in the main power circuit.

In embodiments, the non-resonant current zero-crossing generation circuit includes at least one capacitor operable to discharge and recharge during the fault interruption process, a plurality of semiconductor switches and/or diodes, a control circuit to control the switching of the semiconductor switches, a pulse transformer operable to inject a transient voltage to the main power circuit to force the fault current to cross zero a plurality of times during the fault interruption process and an isolated power supply to pre-charge the at least one capacitor to certain voltage levels in preparation for generating the transient voltage.

In embodiments, the specified response time is between about 0.5 and 5 milliseconds.

In embodiments, the amplitude of said high-frequency AC current is in a range of one to ten times the nominal current of the main power circuit.

In embodiments, the frequency of said high-frequency AC current is in a range of one to several tens of kilohertz.

In embodiments, the pulse transformer comprises a primary winding connected to the power electronic circuit of the non-resonant current zero-crossing generation circuit and a secondary winding connected in series with the main power circuit.

In embodiments, the capacitor is discharged to and subsequently recharged by the main power circuit during the fault interruption process.

In embodiments, the semiconductor switches are operable to control the current going through the pulse transformer and comprise one or more selected from the group consisting of insulated-gate bipolar transistors (IGBTs), thyristors, and power MOSFETs made of silicon or other semiconductors.

The invention further includes a method for interrupting a DC or AC fault current and isolating the fault from a power system. The method includes steps of: detecting a fault current and current direction; activating a non-resonant current zero-crossing generation circuit to force the fault current to cross zero a plurality of times in form of high-frequency AC current within a specified response time window upon detection of fault condition; and opening a mechanical switch to interrupt the fault current and isolate the faulty circuit branch within said time window.

DETAILED DESCRIPTION OF EMBODIMENTS

The invention provides and includes a series-type hybrid circuit breaker with non-resonant current zero-crossing generation method to provide protection against short circuit faults in DC or AC power systems. Embodiments of the invention can be further understood in the following detailed descriptions.

Figure 1:
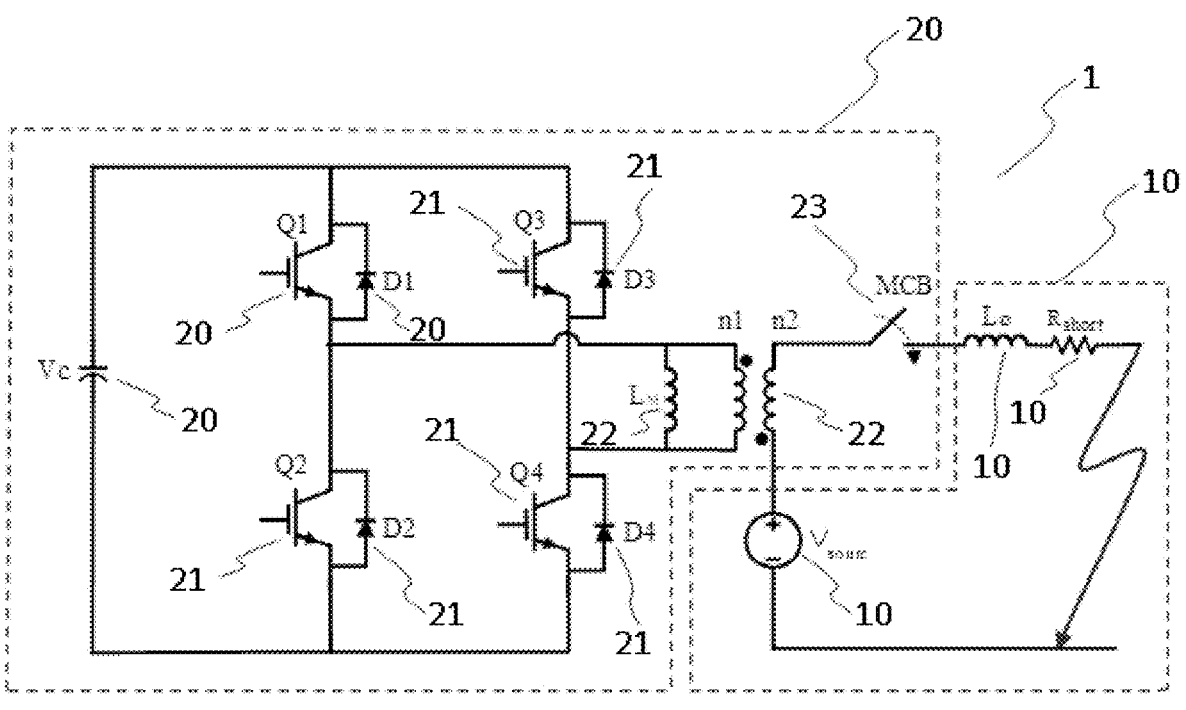
FIG. 1 illustrates a power circuit using the series-type hybrid circuit breaker (SHCB) with non-resonant current zero-crossing generation disclosed in this invention to provide short circuit fault protection.

FIG. 1 illustrates a power circuit 100 using the series-type hybrid circuit breaker (SHCB) 200 to provide short circuit fault protection. The SHCB 200 comprises a mechanical circuit breaker (MCB) 230, a pulse transformer 220, and a power electronic circuit connected to the primary side of the transformer 220. The rest of the main power circuit 100 comprises a voltage source 102 (DC or AC type), a loop inductor 104, and a loop resistor 106 to model the short circuit inductance and resistance, respectively. The primary side power electronic circuit comprises a capacitor 2-4, four transistors Q1 (206), Q2 (210), Q3 (212), and Q4 (214), and four diodes D1 (208), D2 (212), D3 (214), and D4 (216). The main power loop current flows through the secondary winding of the pulse transformer 220. Note that the magnetizing inductance LM 222 is included in the transformer model but the leakage inductances are not for the sake of simplicity. When an overcurrent condition is detected in the main power loop 100, the SHCB 200 is activated by switching the transistors in a controlled manner at a certain switching frequency ranging from 1 to tens of kHz (e.g. between 1 and 90 kHz, preferably between 5 and 20 kHz) to discharge and recharge the pre-charged capacitor 204, as will be described in detail next.

Figure 2:
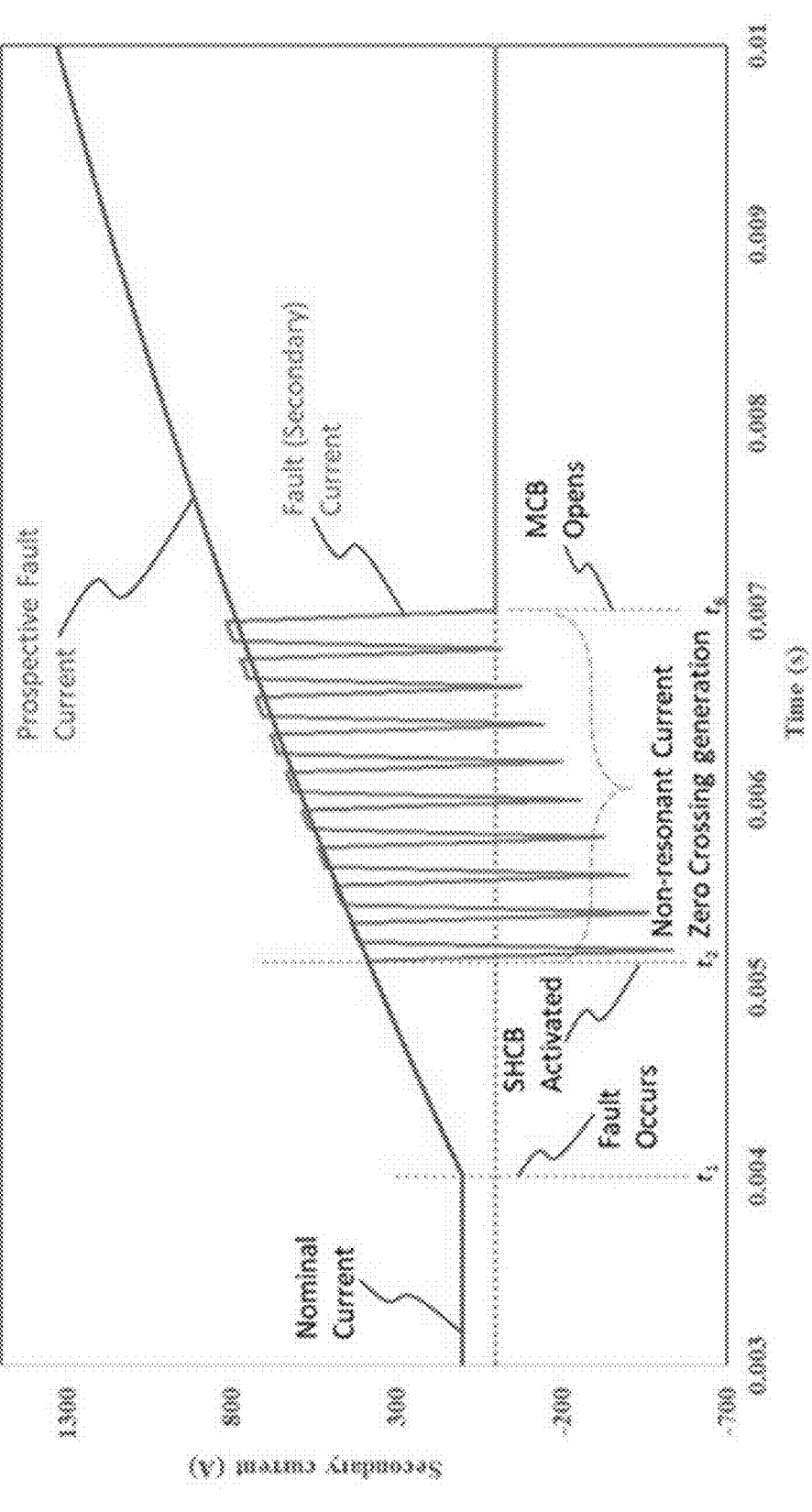
FIG. 2 illustrates the main power loop current (i.e. the transformer secondary current) waveform during a DC fault interruption process over a time period of 0.003 to 0.01 second. The prospective fault current without SHCB operation is also illustrated as a reference.

FIG. 2 illustrates the main power loop current (i.e. the transformer secondary current) waveform during a DC fault interruption process over a time period of 0.003 to 0.01 second. The prospective fault current without SHCB operation is also illustrated as a reference. Prior to $t_1$, the main power loop 100 conducts a nominal current of 100 Ampere (A). A short circuit fault occurs at $t_1$, and the fault current quickly ramps up to about 220 A at $t_2$. The SHCB is then activated at this instant and generate a series of current zero crossings within the next 2 milliseconds (from $t_2$ to $t_6$). At the same time, a control command is sent to the MCB 230 which opens safely at $t_6$ and isolate the faulty section from the power source 102. Note that the positive peak fault current during the interruption process is limited by the prospective short circuit current envelop that is determined by the voltage of the power source 102, the resistance of short resistor 106, the inductances of the loop inductor 104 and the transformer 220, and independent of the secondary side power electronic circuit.

Figure 3:
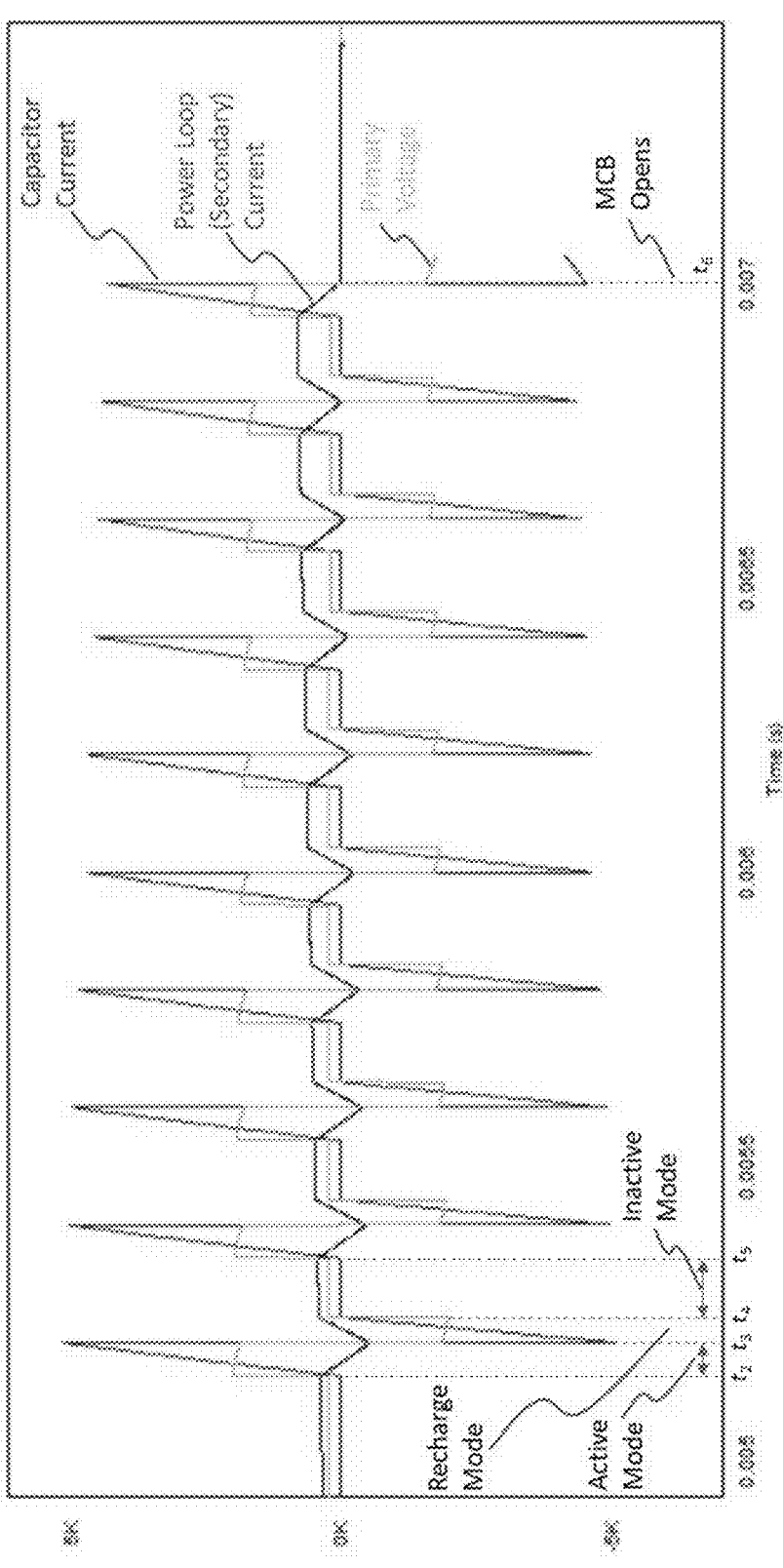
FIG. 3 illustrates the detailed main power loop current (i.e. the transformer secondary current), capacitor current, and transformer primary voltage waveforms during a DC fault interruption process over a time period of 0.005 to 0.008 second.
Figure 7:
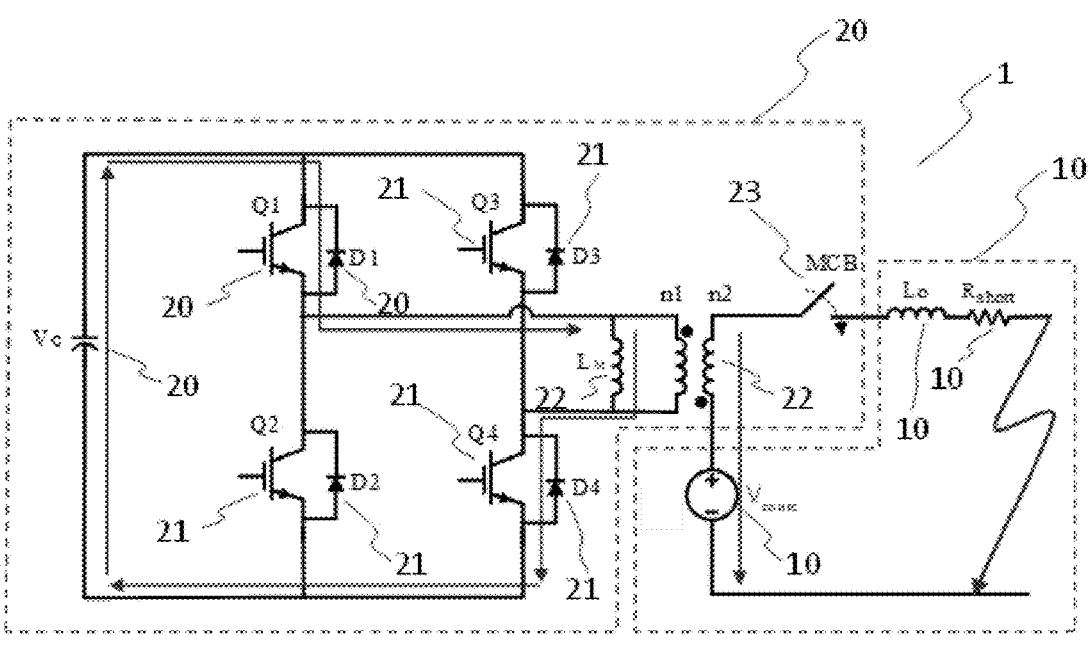
FIG. 7 illustrates the current flows in the SHCB while it being in the "active" mode and the main power loop current flowing into the power source.

FIG. 3 illustrates the detailed main power loop current (i.e. the transformer secondary current), capacitor current, and transformer primary voltage waveforms during a DC fault interruption process over a time period of 0.005 to 0.008 second. Upon detecting an overcurrent flowing out of the power source 102, Q1 (206) and Q4 (214) turn on at $t_2$ and apply the pre-charged voltage of the capacitor 204 to the primary winding of transformer 220 (roughly 2 kV in this example). This in turn generates a counter voltage of roughly 10 kV on the secondary winding of transformer 220. This counter voltage is in the opposite polarity of the voltage source 102 in the main power loop and quickly forces the fault current to flow in the opposite direction (now into the power source 102) and reach a negative peak current of roughly 300 A at $t_3$. The SHCB operates in its "active" mode during $t_2$ to $t_3$. FIG. 7 further illustrates the current flows in the SHCB while it operates in the "active" mode and the main power loop current flowing into the power source. Note that in the SHCB "active" mode, the charge from capacitor 204 is transferred to the main power loop in addition to increase the transformer magnetizing current.

Figure 8:
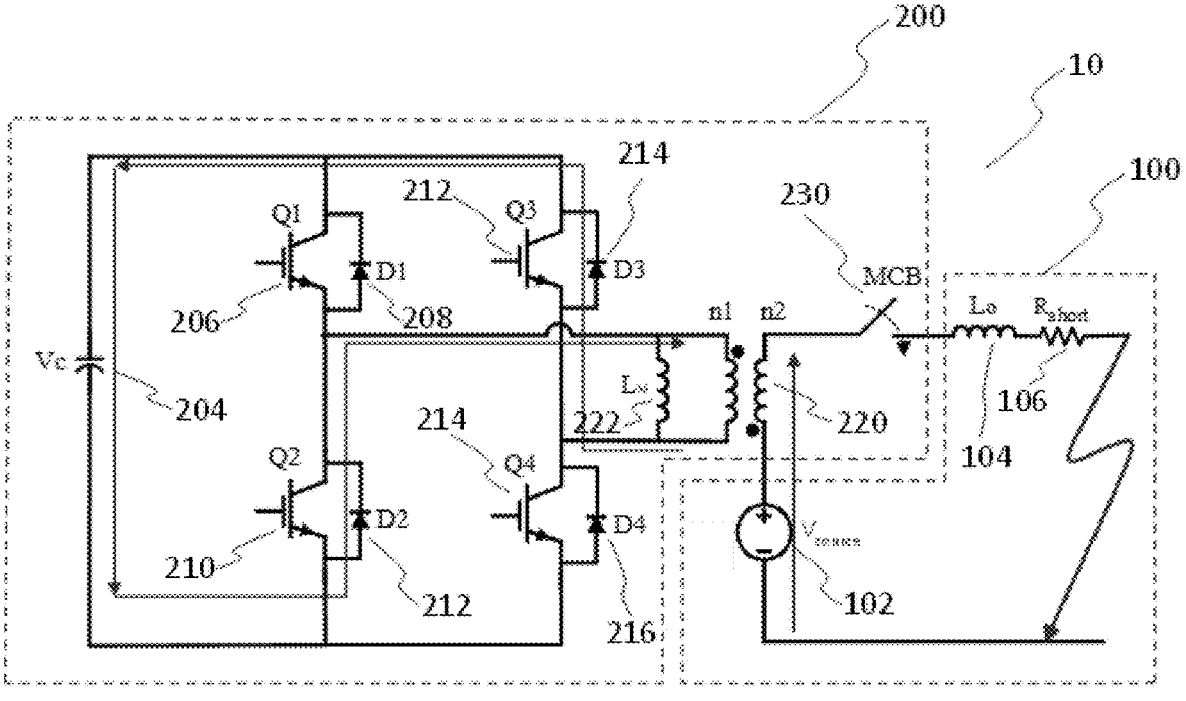
FIG. 8 illustrates the current flows in the SHCB while it being in the "recharge" mode and the main power loop current flowing out of the power source.

At $t_3$, Q1 (206) and Q3 (212) turn off and the freewheeling diodes D2 (212) and D4 (216) turn on to carry the magnetizing current. The SHCB now operates in its "recharge" mode. Note that the pre-charged voltage of the capacitor 204 is now applied to the primary winding of transformer 220 in the opposite polarity (roughly –2 kV), which is transformed into a positive voltage of roughly 10 kV to aid the reversal of the fault current flowing out of the power source 102 again, generating yet another current zero crossing. FIG. 8 illustrates the current flows in the SHCB while it operates in the "recharge" mode and the main power loop current flowing out of the power source. Note that in the SHCB "recharge" mode, the charge is transferred from the main power loop back to capacitor 204 to restore its voltage.

Figure 4:
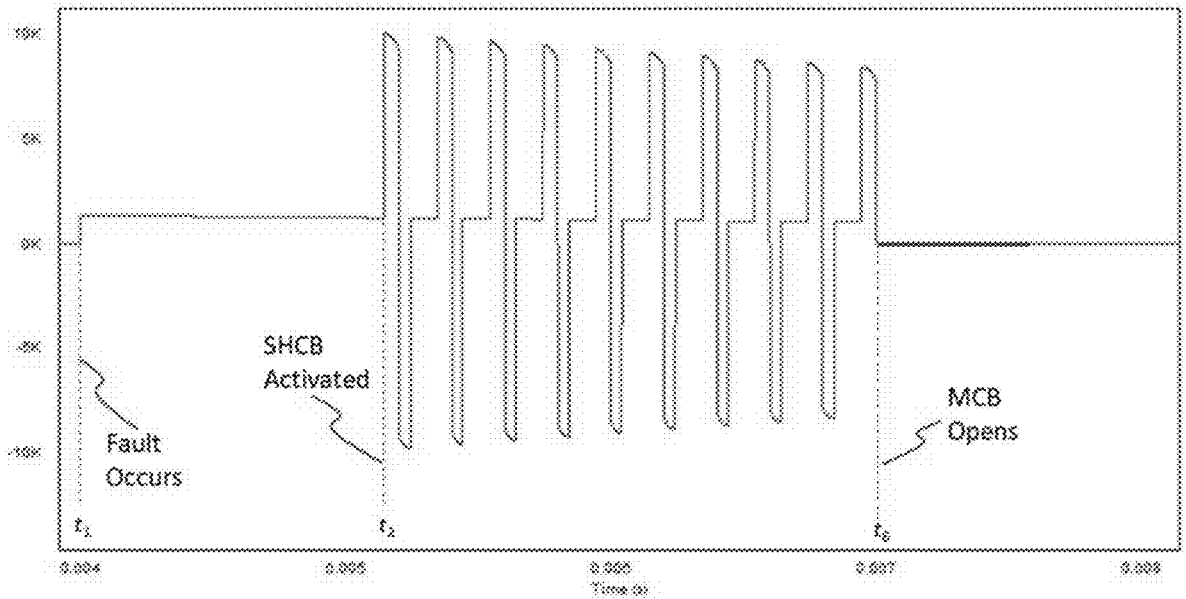
FIG. 4 illustrates the transformer secondary voltage waveform during a DC fault interruption process over a time period of 0.004 to 0.008 second.
Figure 5:
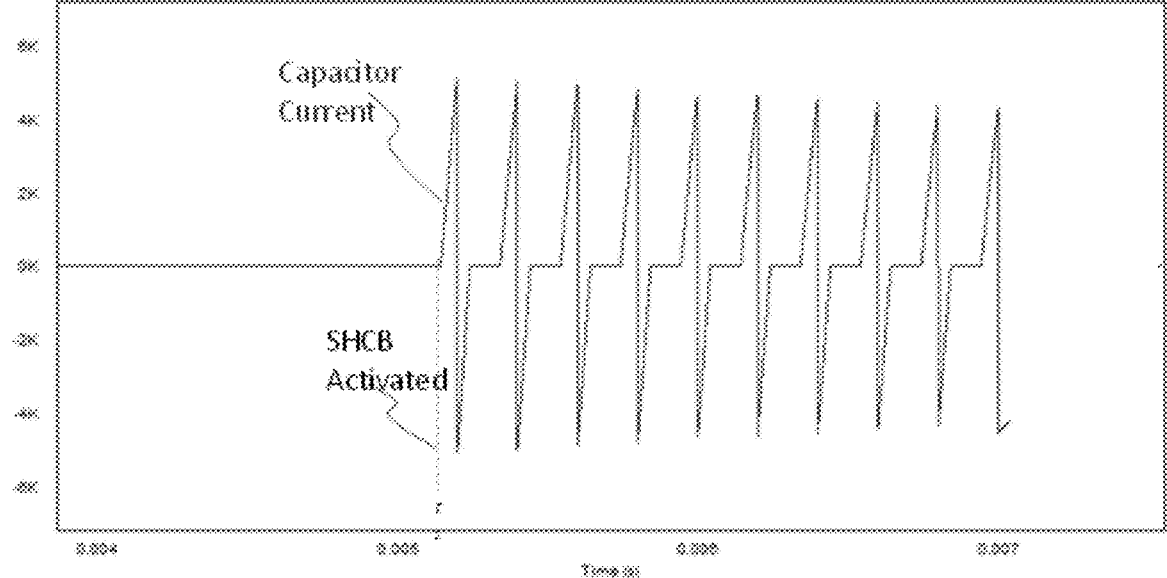
FIG. 5 illustrates the capacitor current waveform during a DC fault interruption process over a time period of 0.004 to 0.008 second.
Figure 6:
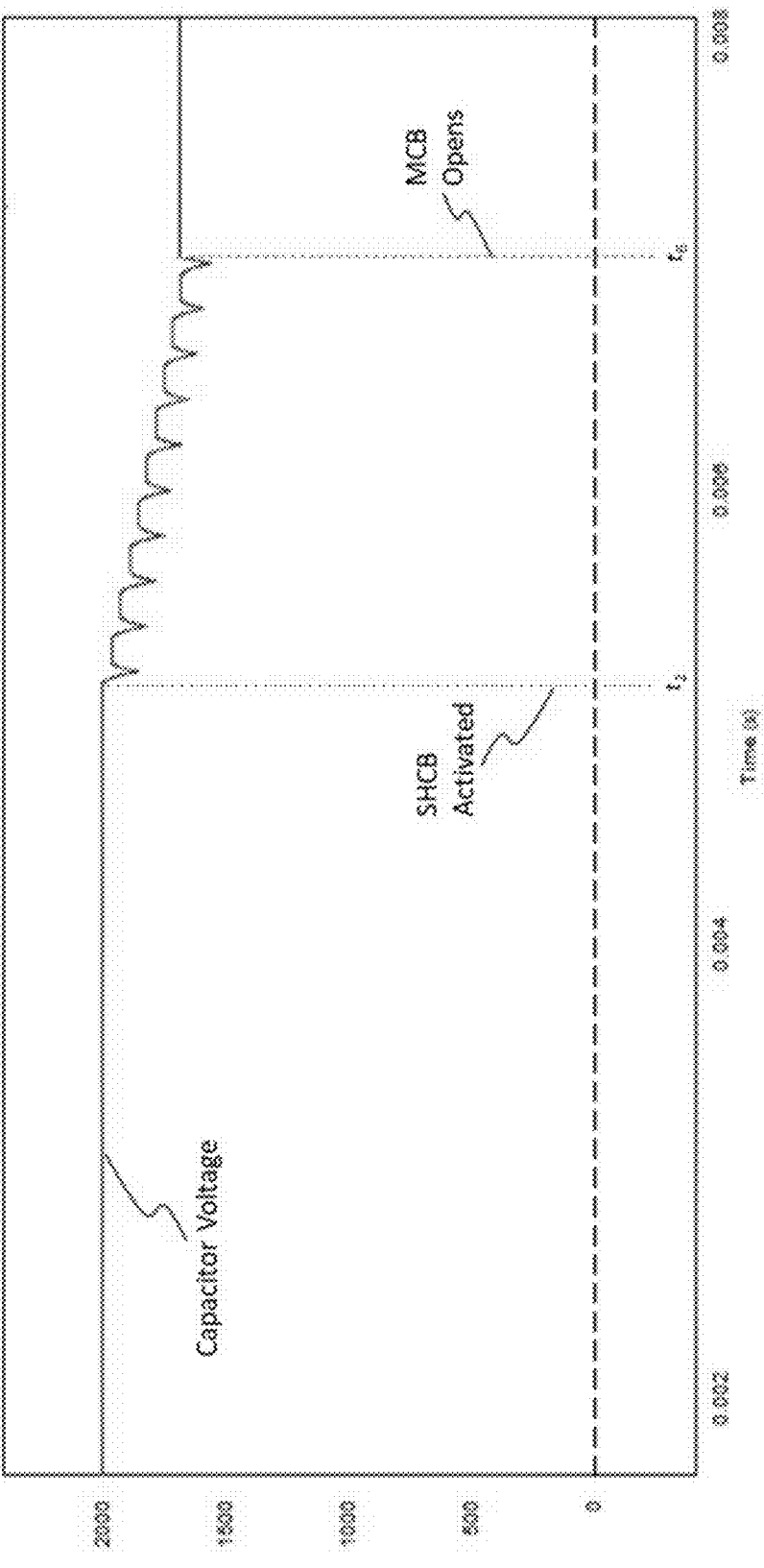
FIG. 6 illustrates the capacitor voltage waveform during a DC fault interruption process over a time period of 0.002 to 0.08 second.

FIG. 4 illustrates the transformer secondary voltage waveform during a DC fault interruption process over a time period of 0.004 to 0.008 second. FIG. 5 illustrates the capacitor current waveform during a DC fault interruption process over a time period of 0.004 to 0.008 second. FIG. 6 illustrates the capacitor voltage waveform during a DC fault interruption process over a time period of 0.002 to 0.08 second. It is observed that the relatively small capacitor 204 (1 mF in this example) is discharged and subsequently recharged throughout the entire fault interruption process from $t_2$ to $t_6$, and its voltage only reduces from the original 2 kV to 1.7 kV after 2 milliseconds of operation. This is quite different from the SHCB design reported previously.

Figure 9:
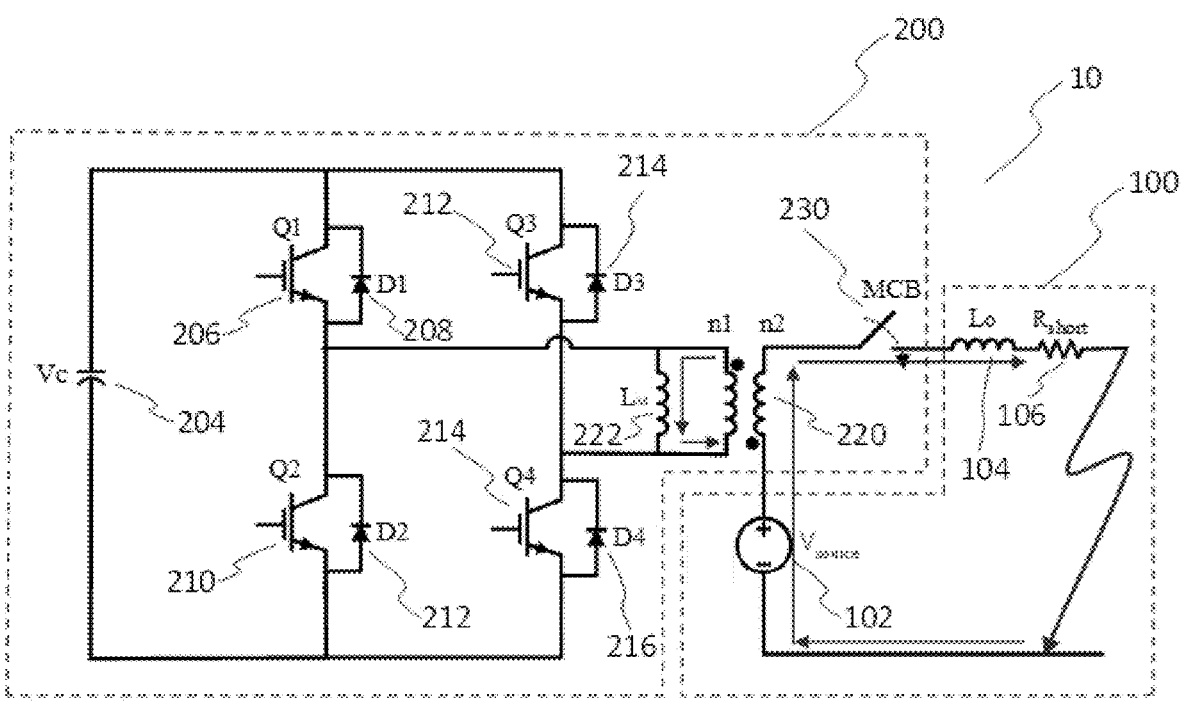
FIG. 9 illustrates the fault current flows when the SHCB is in the "inactive" mode.

At $t_4$, the primary current exceeds the magnetizing current and forces diodes D2 (212) and D4 (216) to turn off and capacitor 204 is now decoupled from the transformer 220. The SHCB is now in its "inactive" mode. FIG. 9 illustrates the fault current flows when the SHCB is in the "inactive" mode. The transformer 220 simply behaves like an inductor in the main power loop in this mode.

The following table summarizes the electrical parameters used for the design example shown in FIGS. 1-9.

| Parameter | Value (example) | Notes |
|---|---|---|
| System DC voltage | 1,500 V | DC power supply voltage |
| Nominal DC current | 100 A | Nominal load current |
| System loop inductance L1 | 500 μH | Parasitic or intentional |
| System loop resistance | 0.552 | To model short resistance |
| MCB | >2 kVAC, >200 A | AC MCB |
| Transformer turn ratio | 5:1 | Secondary to primary ratio |
| Transformer inductance | 200 μH (primary) | Magnetizing inductance |
| Capacitor capacitance/ precharge voltage | 1 mF/2 kV | |
| Q1-Q4 | 3.3 kV IGBT | Active switches of the H-Bridge |
| D1-D4 | 3.3 kV Diodes | Freewheeling diodes of the H-Bridge |
| SHCB Switching frequency | 1-20 kHz | |
| Q1/Q4 or Q2/Q3 duty cycle | 10-50% | Can be optimized |

Figure 10:
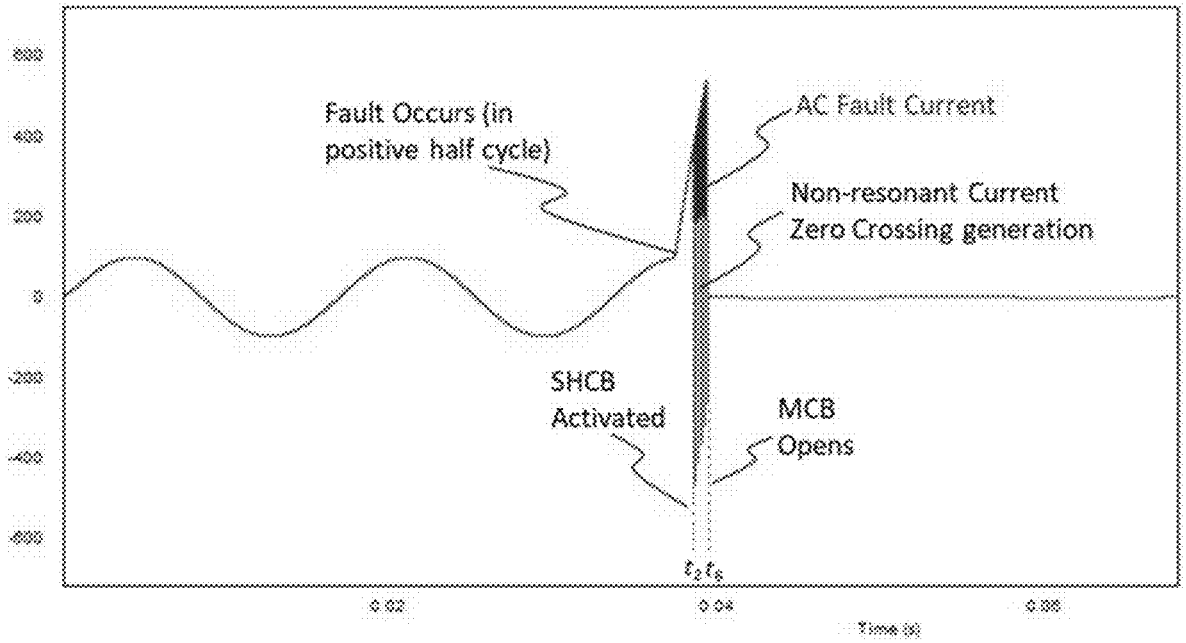
FIG. 10 illustrates the main power loop current (i.e. the transformer secondary current) waveform during an AC fault interruption process when the fault occurs during a positive half cycle over a time period of 0.001 to 0.01 second.
Figure 11:
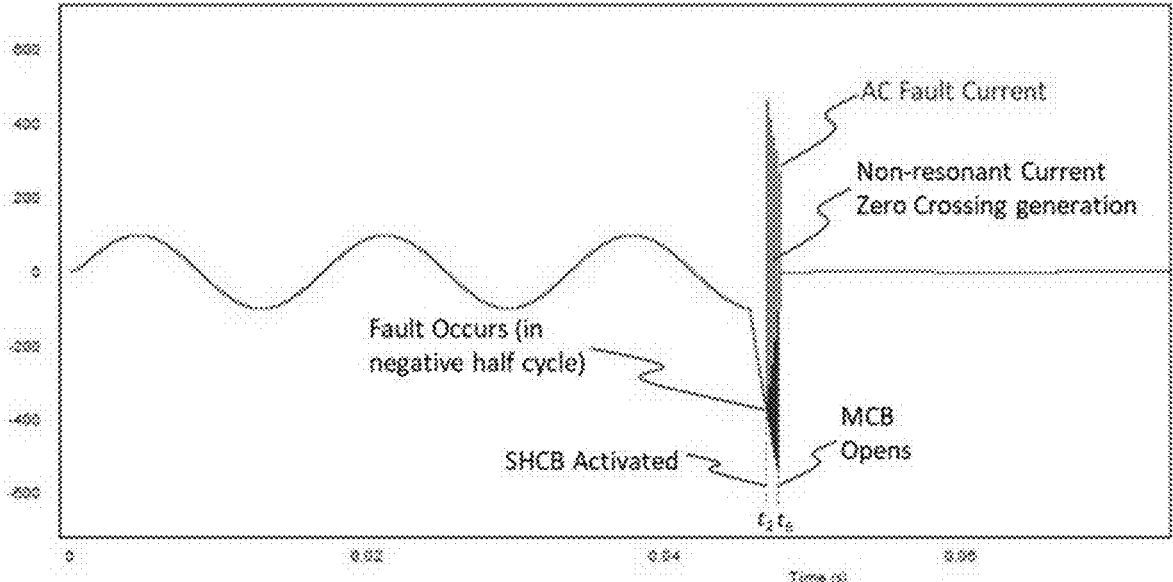
FIG. 11 illustrates the main power loop current (i.e. the transformer secondary current) waveform during an AC fault interruption process when the fault occurs during a negative half cycle over a time period of 0.001 to 0.01 second.

The SHCB design concept of this invention can also be applied to AC power systems. The main power loop 100 in FIG. 1 can be either a DC or AC system depending on the type of voltage source 102. Depending on the direction of current flow at the time of overcurrent detection, either Q1 (206) and Q4 (216) or Q2 (210) and Q3 (212) can be switched on and off to operate the SHCB in "active" and "recharge" modes. FIG. 10 illustrates the main power loop current (i.e. the transformer secondary current) waveform during an AC fault interruption process when the fault occurs during a positive half cycle over a time period of 0.001 to 0.01 second. FIG. 11 illustrates the main power loop current (i.e. the transformer secondary current) waveform during an AC fault interruption process when the fault occurs during a negative half cycle over a time period of 0.001 to 0.01 second.

It will be appreciated that details of the foregoing embodiments, given for purposes of illustration, are not to be construed as limiting the scope of this invention. Although only one exemplary embodiment of this invention is described in detail above, those skilled in the art will readily appreciate that many modifications are possible in the exemplary embodiments without materially departing from the novel teachings and advantages of this invention. Accordingly, all such modifications are intended to be included within the scope of this invention, which is defined in the future claims. Further, the design parameters, such transformer turn ratio and inductance, capacitor voltage and capacitance, switch frequency and duty cycle can be varied and optimized for better performance and lower cost. Further, it is recognized that many embodiments may be conceived that do not achieve all of the advantages of some embodiments, particularly of the preferred embodiments, yet the absence of a particular advantage shall not be construed to necessarily mean that such an embodiment is outside the scope of the present invention.

What is claimed is:

1. A circuit protection apparatus for interrupting a direct-current (DC) or alternating-current (AC) fault current and isolating the fault from the power system, comprising:
   a non-resonant current zero-crossing generation circuit operable to force a fault current in a main power circuit to cross zero a plurality of times in form of high-frequency AC current within a specified response time window upon detection of fault condition;
   a mechanical circuit breaker in series connection with said non-resonant current zero-crossing generation circuit, the mechanical circuit breaker operable to interrupt the fault current and isolate the faulty circuit branch within said time window; and
   at least one current sensor operable to detect the direction and amplitude of current in the main power circuit.

2. The apparatus of claim 1, wherein the non-resonant current zero-crossing generation circuit comprises:
   at least one capacitor operable to discharge and recharge during the fault interruption process;
   a plurality of semiconductor switches and/or diodes;
   a control circuit to control the switching of the semiconductor switches;
   a pulse transformer operable to inject a transient voltage to the main power circuit to force the fault current to cross zero a plurality of times during the fault interruption process; and
   an isolated power supply to pre-charge the at least one capacitor to certain voltage levels in preparation for generating the transient voltage.

3. The apparatus of claim 1, wherein the specified response time is between about 0.5 and 5 milliseconds.

4. The apparatus of claim 1, wherein the amplitude of said high-frequency AC current is in a range of one to ten times the nominal current of the main power circuit.

5. The apparatus of claim 1, wherein the frequency of said high-frequency AC current is in a range of one to several tens of kilohertz.

6. The apparatus of claim 2, wherein the pulse transformer comprises a primary winding connected to the power electronic circuit of the non-resonant current zero-crossing generation circuit and a secondary winding connected in series with the main power circuit.

7. The apparatus of claim 2, wherein the capacitor is discharged to and subsequently recharged by the main power circuit during the fault interruption process.

8. The apparatus of claim 2, wherein the semiconductor switches are operable to control the current going through the pulse transformer and comprise one or more selected from the group consisting of insulated-gate bipolar transistors (IGBTs), thyristors, and power MOSFETs made of silicon or other semiconductors.

9. A method for interrupting a DC or AC fault current and isolating the fault from a power system, comprising:
   detecting a fault current and current direction;
   activating a non-resonant current zero-crossing generation circuit to force the fault current to cross zero a plurality of times in form of high-frequency AC current within a specified response time window upon detection of fault condition; and
   opening a mechanical switch to interrupt the fault current and isolate the faulty circuit branch within said time window.

10. The method of claim 9, wherein the non-resonant current zero-crossing generation circuit comprises:
   at least one capacitor operable to discharge and recharge during the fault interruption process;
   a plurality of semiconductor switches and/or diodes;
   a control circuit to control the switching of the semiconductor switches;
   a pulse transformer operable to inject a transient voltage to the main power circuit to force the fault current to cross zero a plurality of times during the fault interruption process; and
   an isolated power supply to pre-charge the at least one capacitor to certain voltage levels in preparation for generating the transient voltage.

11. The method of claim 9, wherein the specified response time is between about 0.5 and 5 milliseconds.

12. The method of claim 9, wherein the amplitude of said high-frequency AC current is in a range of one to ten times the nominal current of the main power circuit.

13. The method of claim 9, wherein the frequency of said high-frequency AC current is in a range of one to several tens of kilohertz.

14. The method of claim 9, further comprising sensing and measuring a current in the circuit using at least one current sensor.

15. The method of claim 9, further comprising sending a trigger signal to the mechanical switch upon receiving the signal from the momentary circuit interrupter.

* * * * *